United States Patent [19]
Felt et al.

[11] Patent Number: 6,092,092
[45] Date of Patent: Jul. 18, 2000

[54] GAP-BASED STYLE-RUN ARRAY MECHANISM

[75] Inventors: Douglas Felt, Menlo Park; John Raley, San Francisco; Richard Gillam, San Jose, all of Calif.

[73] Assignee: International Business Machines Corporation, Armonk, N.Y.

[21] Appl. No.: 09/042,296

[22] Filed: Mar. 13, 1998

[51] Int. Cl.[7] .......................... G06F 15/00; G06O 11/00
[52] U.S. Cl. .................... 707/530; 707/542; 707/500; 345/472
[58] Field of Search ................... 395/147, 445, 395/805; 707/500, 530; 345/472, 432, 468, 467

[56] References Cited

U.S. PATENT DOCUMENTS

| | | | |
|---|---|---|---|
| 5,457,776 | 10/1995 | Wong et al. ........................... | 395/147 |
| 5,689,723 | 11/1997 | Lim et al. .............................. | 395/805 |
| 5,706,462 | 1/1998 | Matousek .............................. | 395/445 |
| 5,832,530 | 11/1998 | Paknad et al. ........................ | 707/500 |
| 5,877,776 | 3/1996 | Beaman et al. ....................... | 707/542 |
| 5,940,080 | 8/1999 | Ruehle et al. ......................... | 345/432 |

*Primary Examiner*—Jean R. Homere
*Assistant Examiner*—Tri H Khong
*Attorney, Agent, or Firm*—Kudirka & Jobse, LLP

[57] ABSTRACT

Character style information is stored in an array, in parallel with character information stored within another data structure. The style information array has more memory allocated to it than would be required to store the style information. This surplus memory is employed to form a "gap" in the array at a location corresponding to the point at which characters are being modified. The gap permits rapid revisions to character style information, while the array storage mechanism permits rapid random access to the style information of any character. Character style information may be mapped to corresponding characters using a run—array mechanism which associates a style with characters through use of an offset which indicates a starting character to which the style applies and a run length which indicates the number of characters to which the style applies. Additionally, the offset may be related to the beginning or to the end of the document, depending upon whether the associated style run falls before or after the memory gap.

22 Claims, 7 Drawing Sheets

GAP-BASED STYLE-RUN ARRAY MECHANISM

FIELD OF THE INVENTION

The invention relates to word processing systems and, in particular, to the storage and retrieval of character style information.

BACKGROUND OF THE INVENTION

The editing and display of styled text poses particularly difficult problems in the area of data storage. In particular, the editing of large documents may involve the storage of a significant number of styled characters, i.e., characters which have attributes such as bold, italic, etc. associated with them. The style information for these characters should, ideally, be stored in a manner which allows both fast access to a specific character's style information and rapid modification of that information. Additionally, since style information for each character may include a number of attributes and has the potential to consume a great deal of memory, particular attention must be paid to storage efficiency.

The manner in which style formation is stored is therefore a crucial aspect of any system which operates with characters and character style information. On the one hand, instantaneous access to any stored data item would be highly desirable. On the other, the ability to rapidly revise individual data items is also extremely advantageous. Unfortunately, the goals of rapid random access and quick revisions often operate at cross purposes. For example, array-based storage provides rapid random access to individual stored items. However, adding elements to, or removing elements from, an array can be very time consuming. In the array approach, a block of memory is reserved for the contiguous storage of data elements. Because the elements in the array are stored contiguously, an individual element may be rapidly accessed simply by providing an address having an offset into the array. However, since the array elements generally must be stored contiguously in order to yield this rapid random access, adding elements to or removing elements from the array requires a great deal of time. That is, when an element is removed from the array, other elements in the array must be moved to "fill in the gap" left behind by the removal of the element. Similarly, when an element is added to the array at some location other than the end of the array, existing elements must be moved to make room for the added element. The time-consuming nature of this sort of data element shuffling is particularly egregious in systems involving a large number of data elements, such as a word processing system. Although linked list storage permits the rapid addition or removal of data elements, random access to individual elements can be painfully slow.

Adding data elements to or removing data elements from a linked list is relatively fast and simple. Since each element in the list occupies a separate block of memory and includes a pointer to the next item in the list, an element may be added or deleted simply by adjusting a few pointers. However, a linked list does not provide truly random access to a specific data element, because the list must be searched sequentially, going from element to element via the pointers, until the desired element is encountered.

In short, a system which requires relatively little storage for character style information and which, at the same time, provides rapid random access to stored character style information, would be highly desirable.

SUMMARY OF THE INVENTION

The foregoing need is satisfied in a character storage system in which, in an illustrative embodiment, character style information is stored in an array that has more memory allocated to it than the minimum memory that would be required to store the style information. This "surplus" memory is employed to form a "gap" of empty memory locations in the array at a location corresponding to the point at which characters are to be modified. The gap permits rapid revisions to character style information, while the array storage mechanism permits rapid random access to the style information of any character.

Additionally, in one embodiment of the invention character style information may be mapped to corresponding characters using a "run-array" mechanism which associates a style with one or more characters through use of an offset, which indicates a starting character to which the style applies, and a run length, which indicates the number of characters to which the style applies.

In another embodiment of the invention, the offset may be "polarized", i.e., related to either the beginning or to the end of the document, depending upon whether the style run is located before or after the array gap.

Additionally, the character style storage system may also employ a persistent iterator which retains the position of a previous style run-array access. In a subsequent style-run array access, the array is scanned from the position indicated by the persistent iterator in order to locate a style run of interest, i.e., a style run associated with a character whose style is modified.

The polarized offset and persistent iterator approaches may be combined to locate style runs for modification, which the polarized offset approach employed to locate a style run whenever a style run is to be added to or deleted from the style run array and the persistent iterator employed otherwise.

BRIEF DESCRIPTION OF THE DRAWINGS

The above and further advantages and aspects of the invention may be better understood by referring to the following description in conjunction with the accompanying drawings in which.

DETAILED DESCRIPTION

Figure 1:
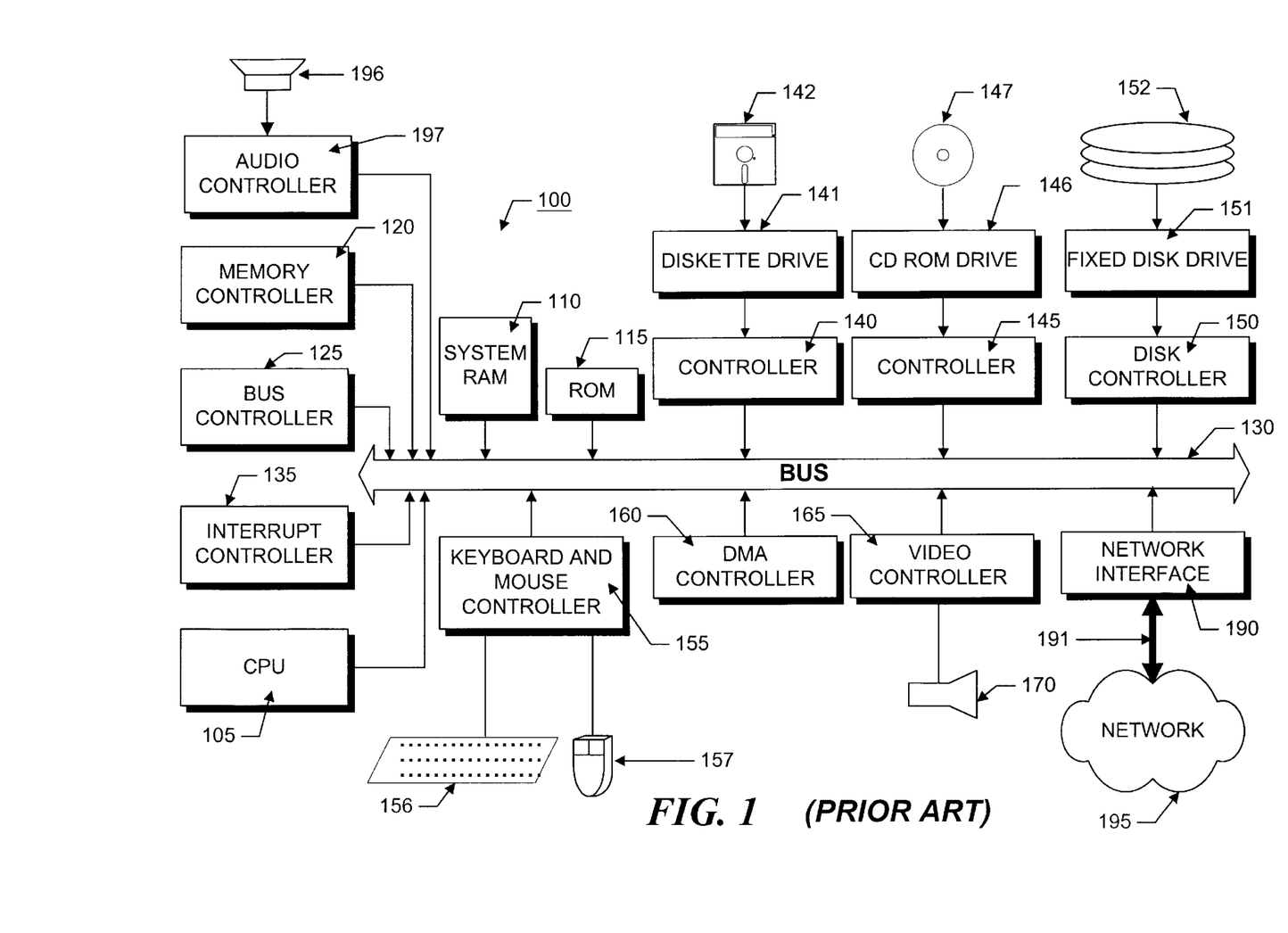
FIG. 1 is an illustrative block schematic diagram of a computer system on which the new number translation engine may be implemented.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as an IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150. DMA controller 160 is provided for performing direct memory access to RAM 110.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software. The operating system controls allocation of system resources and performs tasks such as process scheduling, memory management, 20 networking, and I/O services, among other things. In particular, an operating system resident in system memory and running on CPU 105 coordinates the operation of the other elements of computer system 100. The present invention may be implemented with any number of commercially available operating systems including OS/2, UNIX and DOS, WINDOWS etc.

In the illustrative embodiment, the software elements of system are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which act as templates that instruct the computer how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise, objects are destroyed by a special function called a destructor. Objects may be used by using their data and invoking their functions. When an object is created at runtime, memory is allotted and data structures are created.

The principal benefits of object-oriented programing techniques arise out of three basic principles; encapsulation, polymorphism and inheritance. More specifically, objects can be designed to hide, or encapsulate, all, or a portion of, their internal data structure and internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows functions which have the same name to perform the same conceptual operations on different kinds of data. For example, an addition function may be defined as variable A plus variable B (A+B) and this same format can be used whether the A and B are numbers, characters, or pictures. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common name (A+B) and, at runtime, the program will determine which of the three functions is actually called by examining the variable types. Polymorphism, like encapsulation, decreases the amount of information different parts of a program have to have about each other in order to operate properly.

The third principle which underlies object-oriented programming is inheritance, which allows program developers to easily reuse pre-existing objects and to avoid creating software from scratch. The principle of inheritance allows a software developer to declare classes (and the objects which are later created from them) as related. Specifically, classes may be designated as subclasses of other classes. A subclass "inherits" and has access to all of the public functions of its base classes just as if these functions appeared in the subclass. A subclass can override some or all of its inherited functions to behave in a way that is appropriate for, or modifies, an object instantiated from the subclass. The creation of a new subclass which has some of the functionality (with selective modification) of another class allows software developers to easily customize existing code to meet their particular needs.

In the illustrative embodiment, a word processor which stores and modifies character style information operates on a computer system 100 and employs random access memory 110 for the temporary storage of style information and a hard drive 152 for non-volatile storage. In particular, the word processor stores character style information in a gap-based array within memory 110. A gap-based array is an array which, as will be explained in greater detail in the discussion related to FIGS. 2–7 has surplus memory allocated to it and the surplus "empty" memory is moved, by an editor that employ the CPU 105, within the array to form a gap at a location where style information is to be modified, thereby accelerating the style-modification operation. An array generator, such as the CPU 105, generates the style array within the memory 110. The style array is a separate, parallel, data structure from another data structure, presumably an array, which stores the actual characters.

Although the gap-based style array could be implemented with an entry for each character in a given document, in accordance with the principles of the invention, such an array would typically be at least as large as, and possibly larger than, the corresponding character array. The style array operates as an index to map the array of characters to a much smaller array of style characters. For this reason, the illustrative embodiment employs a style run approach, which significantly reduces the amount of storage required for the style array.

As an example of the efficiency of style-run storage, in the sentence:

This is some style text.

There are 25 characters, but only three different types of styling information. In the illustrative embodiment, the style information is organized into style runs associated with a contiguous group of characters having the same style. Each style run has some indication of the location and number of contiguous characters having a particular style. For the above sentence, there would be four style runs, one for the characters in the word "this," which are all bold, the second for the characters in the words "is some," which are normal, a third for the characters in "style," which are italic, and a fourth style run for the characters in the string "text," which is normal. Employing style runs in this fashion permits the reduction of array entries. In this example, the number of array entries has been reduced from the 25 of the one-character-per-entry implementation, to the four entries of a style run implementation.

Figure 2A:
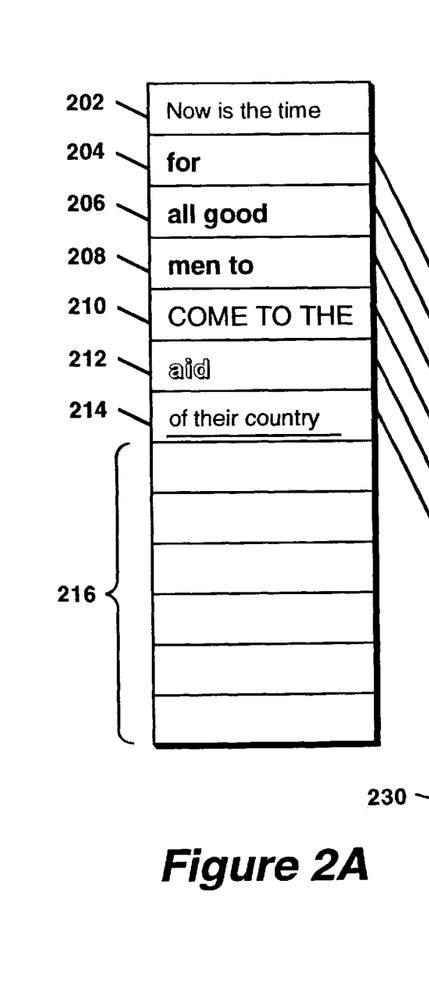
FIGS. 2A, 2B, 2C, is a conceptual block diagram of a style-run array which illustrates the gap-formation and style-run modification process.

Turning now to the style information of the sentence:

"Now is the time for all good men to COME TO THE aid of their country."

which may be stored in an array 200, as illustrated FIG. 2A. It is important to note that the actual contents of the array are style runs, of which one is illustrated in FIG. 2D. The array 200 stores style information: characters are not stored in this data structure. Characters are included in the array illustrations merely to aid in explanation of the array's operation. Each of the style runs, as illustrated in FIG. 2D, includes, the location 230, length 232, and the style information 234 which allows a processor to associate a character stored in a parallel data structure (not shown) with style information contained in the style run array 200.

The style run information associated with "Now is the time" i.e. arial, twelve point, twelve characters, stored in the first array location 202, the style information associated with the character string "for" i.e. aral, twelve point, bold, three characters, stored in array location 204, style information associated with the character string "all good," i.e. arial, fourteen point, bold, seven characters, stored in array location 206, the style information for character string "men to" i.e. aral, ten point, bold, five characters, stored in array location 208, the style information associated with the character string "come to the," i.e. aral, twelve point, all caps, nine characters, stored in array location 210, the style information for the character string "aid," i.e. aral, fourteen point, shadow, three characters, stored in location 212, and the style information for the character string "of their country," i.e. arial, twelve point, underline, fourteen characters, stored in array location 214. An unused memory block 216 is located at the end of the array to accommodate expansion and contraction of the runs (which may result in fewer or more runs, respectively).

Figure 2B:
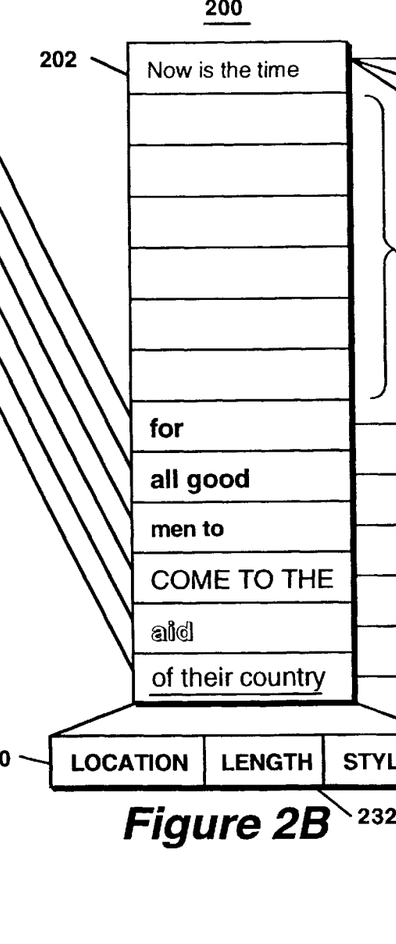
Figure 2C:
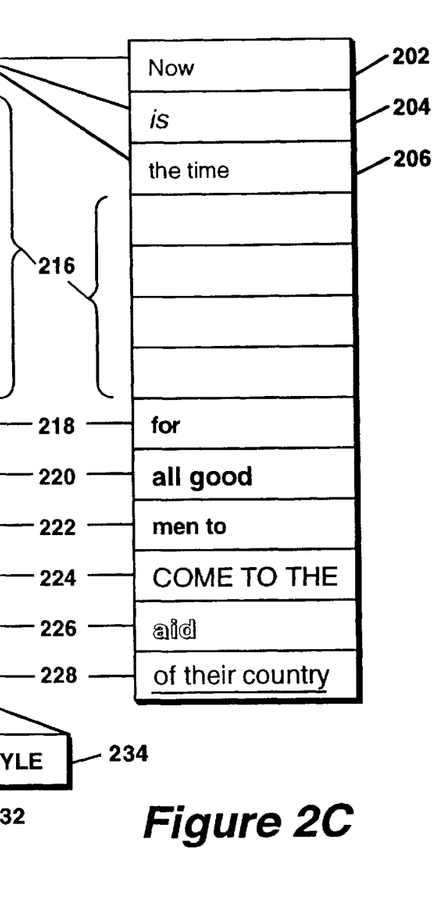

Suppose now that the character string "is" is italicized in accordance with a well-known word processor operation. This operation will be reflected in the style runs and, accordingly, the style run for the character string "now is the time" will be split into three style runs: one for "now," one for "is," and one for "the time." In accordance with the principles of the illustrative embodiment, a "gap" of unused array locations is located immediately after the location containing the style run for the character string "now is the time." As illustrated in FIG. 2B, this gap creation may be accomplished by moving the style runs as indicated, with the style run from locations 204, 206, 208, 210, 212 and 214 moved respectively to locations 218, 220, 222, 224, 226 and 228. With a gap thus formed, the style run for character string "now is the time" may be readily split into three style runs, as shown in FIG. 2C, which occupy array locations 202, 204 and 206. The style run for "is" may then be updated to an italics style, by updating a pointer, for example.

Italicizing "is" in this manner requires 8 element copies to move the style runs from locations 204–214 to location 218–228, respectively, to load the style runs for "is" from location 202 to location 204, and the style run for "the time" to location "206." A conventional style run array, e.g., a style run array in which all style runs are maintained at contiguous locations, could execute this italicization of the character string "is," in the same number of steps.

Figures 3A, 3B:
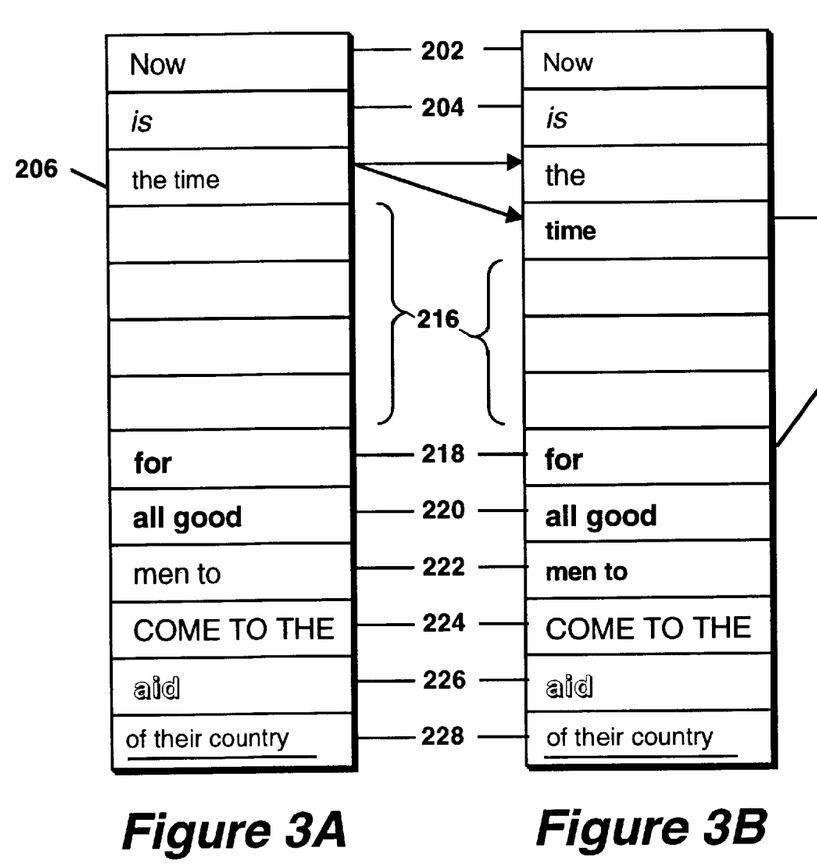
FIGS. 3A, 3B, 3C is a conceptual block diagram of a style run array which illustrates the removal of a style run in accordance with the principles of the invention.
Figure 3C:
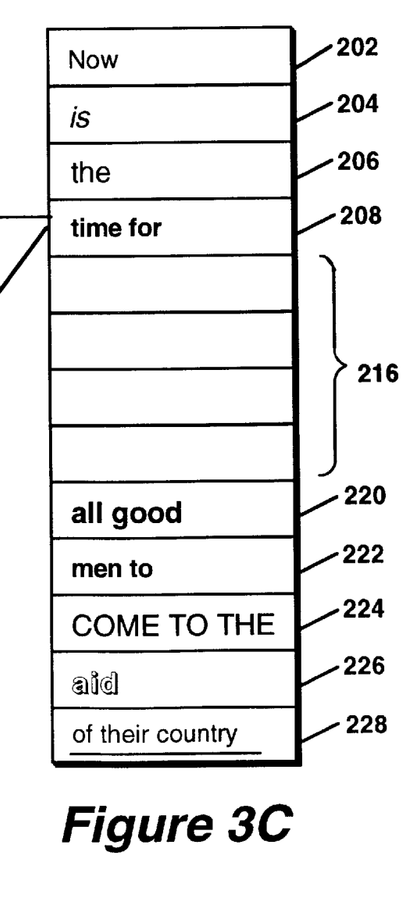

However, as illustrated by the sequence of FIGS. 3A, 3B, and 3C, if further style modifications are to be made on any of the characters bordering the gap 216 between locations 206 and 218, this operation can be effected quite rapidly. That is, assume that the characters "time" are to be given the "bold" style characteristic. In FIG. 3B, the style run for the characters "the time" is divided into two runs: one for the string "the" in location 206, which remains "unbolded," and one for the string "time" which is now bold in location 208. Because the string "for" in location 218 is also bold, the style runs for "time" and "for" may be combined, as illustrated by FIG. 3C, into one style run in location 208, thereby minimizing the number of array locations required to store the style run information. In this case, i.e., adding a "bold" style to the character string "time" the new gap based style run approach only required the copying of one element, modification of the new element, and removal of one element. Modification and removal each require approximately the same time to execute as an element copy. Consequently, the time required for the new gap-based style run array approach is approximately the same as three element copies. In contrast, a conventional style run array approach would require fourteen element copies. The difference is due to the conventional array's requirement of keeping the style runs in contiguous locations.

Figure 4A:
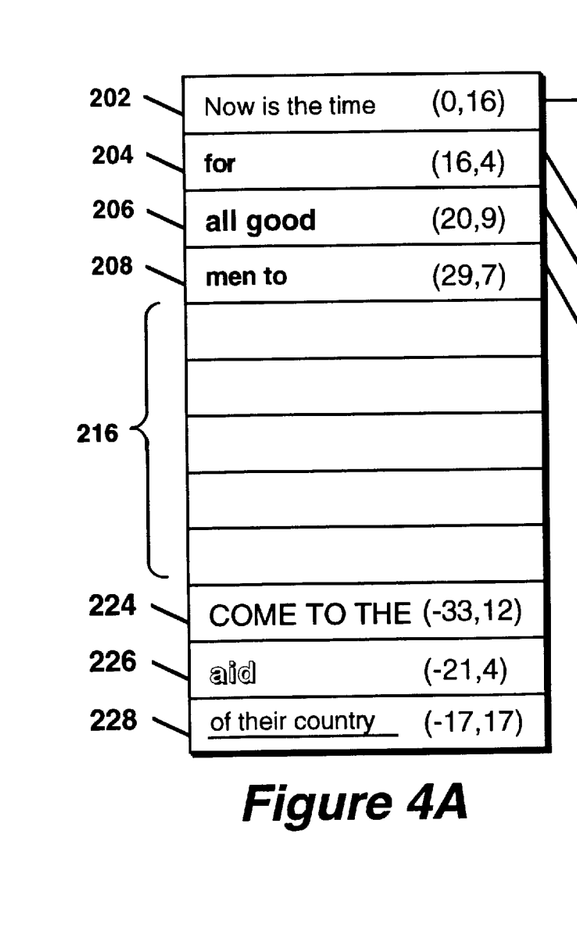
FIGS. 4A, 4B is a conceptual block diagram of a style run array which illustrates the use of "polarized" offsets.
Figure 4B:
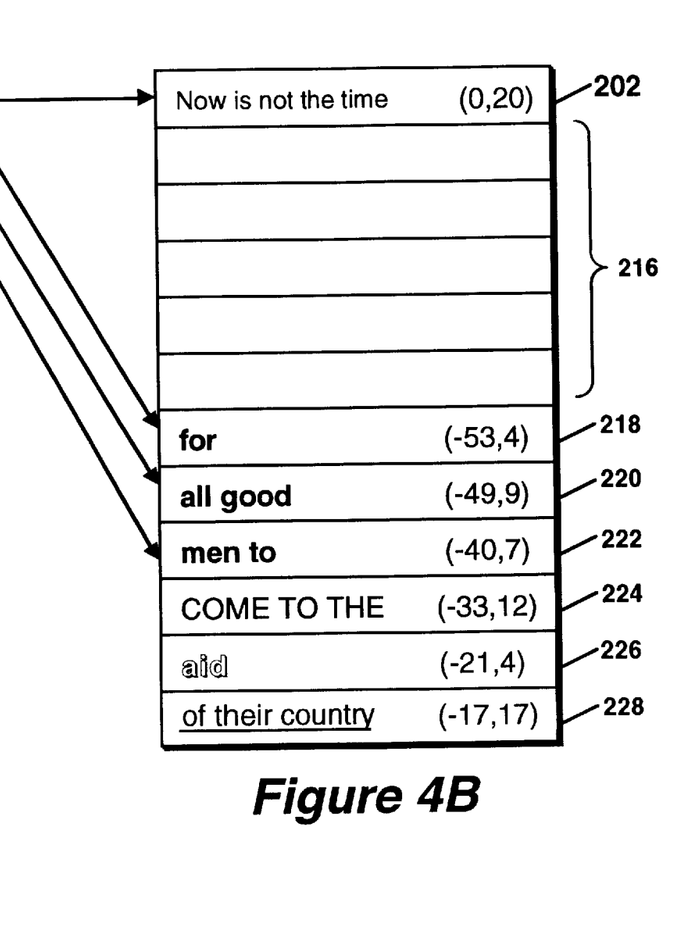

A method of associating characters with style runs in the style run array will now be addressed with reference to FIGS. 4A and 4B. This mapping of style to characters may be achieved by including in each style run array element a pointer (or pointers) to style indicators, an offset from the beginning of the parallel character array to the beginning of the style run, and the length of the run (number of characters associated with the run). Although it is relatively easy to locate a style run associated with a given character by employing a binary search on a array such as this, changes to the length of any style run must be reflected in all subsequent style runs. That is, the offsets from the beginning of the array to the beginning of the style run will require updating. If there are a large number of characters involved, this will be a time consuming process.

In order to avoid this process, in one illustrative embodiment, style runs located "before" the array gap have their offsets calculated relative to the beginning of the document and runs located after the array gap have offsets calculated from the end of the document as illustrated in FIG. 4A. With this "polarized offset" approach, a style run's offset value is preferably adjusted whenever the style run is copied into a new location. Consequently, only the offset values for the style runs between the change position and the array gap need to be updated and, if the gap is located immediately after the change position, no style run offsets need to be updated. In the example of FIG. 4A, the character string "not" is inserted between "now is" and "the time". Note that this operation will affect existing style runs only insofar as their offsets are concerned, i.e., there are no style changes to any of the existing characters. Offset and run length information is included with each element, as indicated by the numbers in parenthesis, with the offset as the first of the pair of numbers and its length as the second of the pair of numbers. Note that for locations after the gap 216, the offset numbers are negative, indicating that the offset is from the end of the document to the first character associated with the style run.

Since characters are to be added to the character string "now is the time", a gap is formed immediately after the associated style run, in location 202, by moving the style runs from locations 204, 206, and 208, respectively, to locations 218, 220, and 222. After moving the style runs in this fashion and updating the first style run length indicator, i.e., from 16 to 20, as in FIG. 4B, the offset indicator for each of the style runs moved to the other side of the gap are updated to reflect the new offset from the end of the array and, correspondingly, from the end of the document. That is, for the "men to" style run, the offset value is changed from 29 to −40. For the "all good" style run, the offset value is changed from 22 to −49 and for the "for" style run, the offset value is changed from 16 to −53.

Note that a subsequent change to the first style run, in location 202, can be accommodated without changing the offset indicator in any of the other existing style runs. In this manner, offsets may be updated at the same time that style runs are added or removed and none of the style runs not involved with the addition or removal need have their offset value updated. Individual style runs within the style run array may be located using a binary search algorithm, so long as the binary search algorithm takes the gap and differing offset polarities into account.

Figure 5:
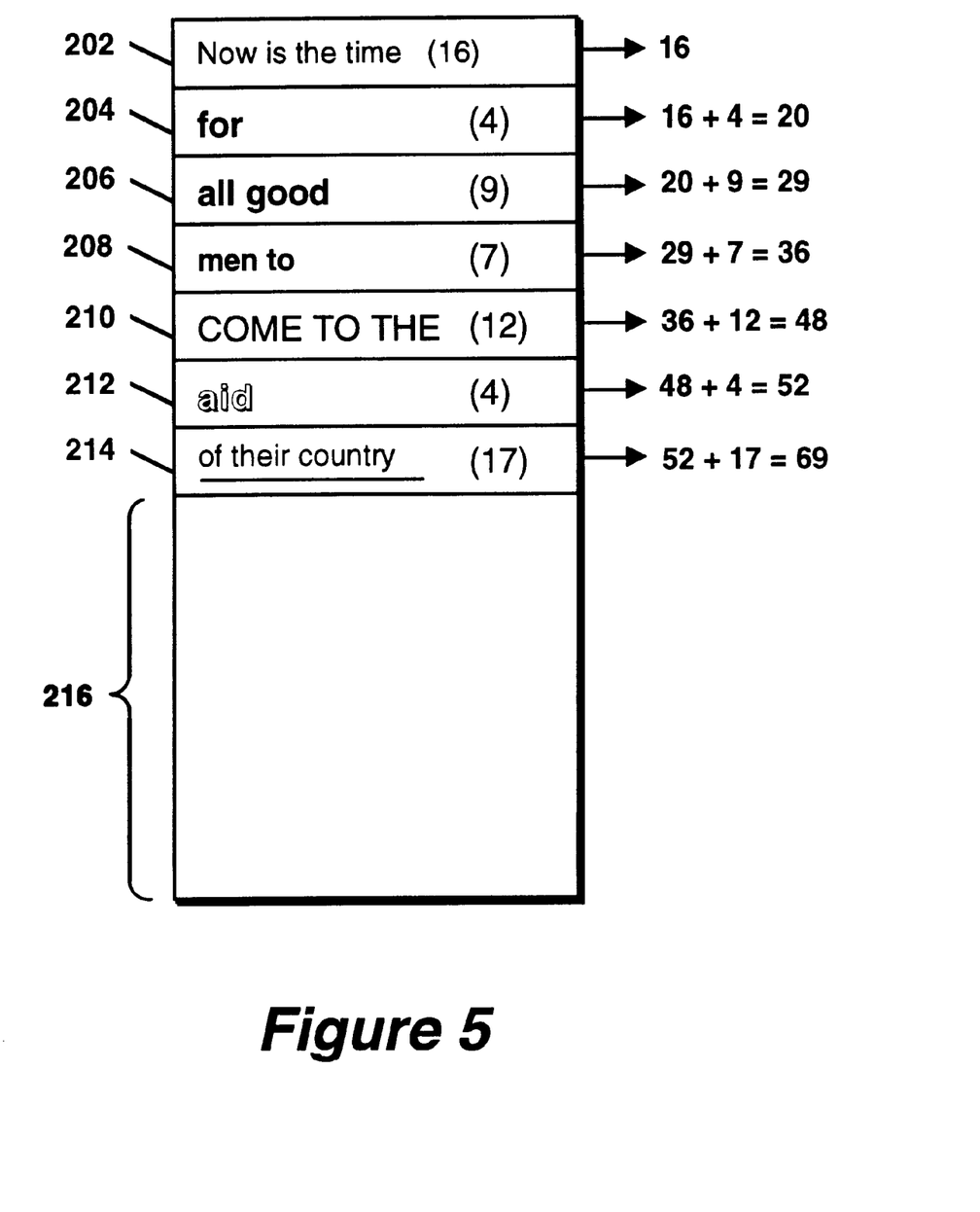
FIG. 5 is a conceptual block diagram of a style run array which illustrates the process of locating style run without the use of offsets.

In another aspect of the illustrative embodiment of the invention the style run lengths are stored, but the offsets are not. Since no such offsets are stored, no offsets need be updated. Rather than locating a given character style within the style run array using a binary search, each style run is examined from the beginning of the array, accumulating lengths until the style run which includes the character style information of interest is encountered. For example, suppose the style information for the character in position 40 within the parallel character array is desired. FIG. 5 offers a visual aid in this example. The length information within style location 202 is acquired and, since 40 is greater than 16, the length information from the style run in location 204 is added to that of location 202. The result, i.e., 20, is less than 40, so the process proceeds until the accumulation is greater than 40, that is, until the length indication location 210 is added to the total and in this manner, the character style information for location 40 is uncovered.

In an object-oriented approach, an iterator object may assigned the task of accumulating the lengths and, if this object is a persistent object, the task of searching for a random character's style information may be somewhat eased. The persistent iterator acts to "keep its finger in the page", i.e. to mark the location of the most recently acted upon character style information. Referring again to the example of FIG. 5, once position 40 is located within style runs, locating position 30 would only require the iterator to seek back to location 208, rather than seeking from location 202 to location 204, etc., until it reached position 30 within the array location 208. This persistent iterator approach is especially advantageous in a situation where many random accesses take place within a localized area of a document, which is reflected in many random access within the localized area of the style array, or where style runs are accessed sequentially.

Although use of the persistent iterator, as just discussed, eliminates the need for updating style run offsets, and thereby accelerates the system's operation, random access to a specific character's style is more time consuming than may be achievable using a binary search. In yet another aspect of the illustrative embodiment, a persistent iterator is combined with the "polarized offset" approach described in the relation to FIG. 4. In this approach, "polarized offsets" are employed to update style runs until an update to a style run does not involve adding a style run to, or deleting a style from, the style run array. Those updates that do not involve additions to or deletions from the style run array employ the persistent iterator. For subsequent style run array updates, the persistent iterator would be employed until an update requires that a style run be added or deleted is encountered. At this point, "polarized offsets" are calculated and the polarized offset approach is employed until, once again, a style run array update is encountered which does not involve adding a style run to or deleting a style run from the style run array. These update and access methods are described in greater detail in the discussions related to the flow charts of FIGS. 6 and 7, respectively.

Figure 6:
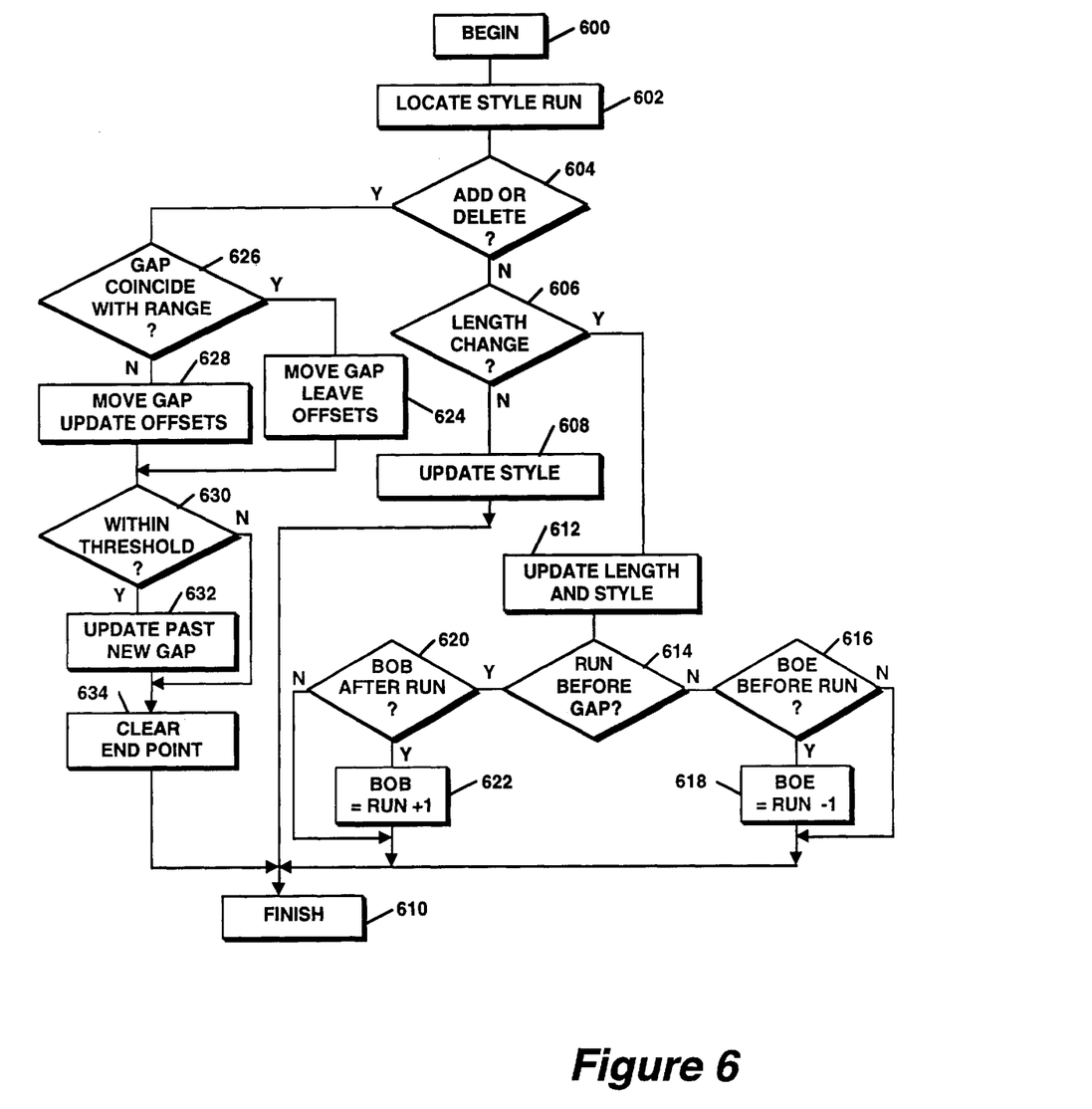
FIG. 6 is a flow chart which illustrates the process of updating a style run.

The flow chart of FIG. 6 sets forth, in greater detail, the method in which style runs are updated in the illustrative embodiment. The process employs two variables, "bad offset end" (BOE) and "bad offset begin" (BOB), which respectively correspond to an offset value that falls between the array gap and the end of the array, and an offset value that falls between the array gap and the beginning of the array. The process begins in step 600 and proceeds from there to step 602. In step 602, the style run containing style information of the character of interest is located. The process of locating the appropriate style run is discussed in greater detail in relation to FIG. 7. From step 602 the process proceeds to step 604 where it is determined whether a style run will be added or deleted. If no style run is to be added or deleted, the process proceeds from step 604 to step 606 where it is determined whether any style run length will change. If no style run lengths will change, the process proceeds from step 606 to step 608, where style information is updated, and, from step 608, to finish in step 610.

If, in step 606, it is determined that a style run's length will change, the process proceeds from step 606 to step 612 where the style information and length are updated. From step 612, the process proceeds to step 614, where it is determined whether the style run lies before or after the style run array gap. If the style run being operated on does not lie before the gap, that is, if it lies after the gap, the process proceeds to step 616 where it is determined whether the end of the gap indicator, BOE, lies before the present style run. If BOE lies before the present style run, the process proceeds to step 618 where BOE is updated to point to the style run immediately preceding the present style run. From step 618, the process proceeds as it otherwise would from step 616 to finish in step 610.

Returning to step 614, if it is determined that the present run lies before the style run array gap, the process proceeds to step 620 where an indication of the location of the beginning of the gap, bad offset begin, BOB, is checked to determine whether it lies after the present run. If BOB lies after the present run, the process proceeds from step 620 to step 622 where BOB is updated to the location of the next run after the present run. From step 622 the process proceeds as it would have in step 620 to finish in step 610.

Returning to step 604, if it is determined that the present operation adds a style run to or deletes a style run from the style run array, the process proceeds from step 604 to step 626 where it is determined whether the gap coincides with the range determined by BOB and BOE. If the new gap position is outside the range defined by BOB and BOE, or if BOB and BOE are empty, the process proceeds to step 628, where the gap is moved adjacent to the style run being operated upon, i.e., the style run uncovered in step 602, and offset values are updated to coincide with the boundaries of the new gap.

If the new gap position is inside the range defined by BOB and BOE, in step 626, the process proceeds to 624, where the style run array gap is moved adjacent to the style run being operated upon. The offset values, BOB and BOE are not updated in this case. The process then proceeds, as it would have after step 628, to step 630 where it is determined whether the current run was within the bad offset range by a threshold value, which may be zero, or a value determined empirically to efficiently update offset values. If the current run was within the range, the process proceeds to step 632 where the new offsets are updated past the new gap positions. After step 632, the process proceeds as it would have after step 632, to step 634 where either the BOB or the BOE value is cleared, as appropriate. For example, if the gap is moved toward the beginning of the array and past the location pointed to by BOB, or within a few locations of that pointed to by BOB, the index BOB is cleared. Similarly, if the gap is moved toward the end of the array, past BOE or within a few locations of the location pointed to by BOE, the BOE value is cleared. From step 634, the process proceeds to finish in step 610.

Figure 7:
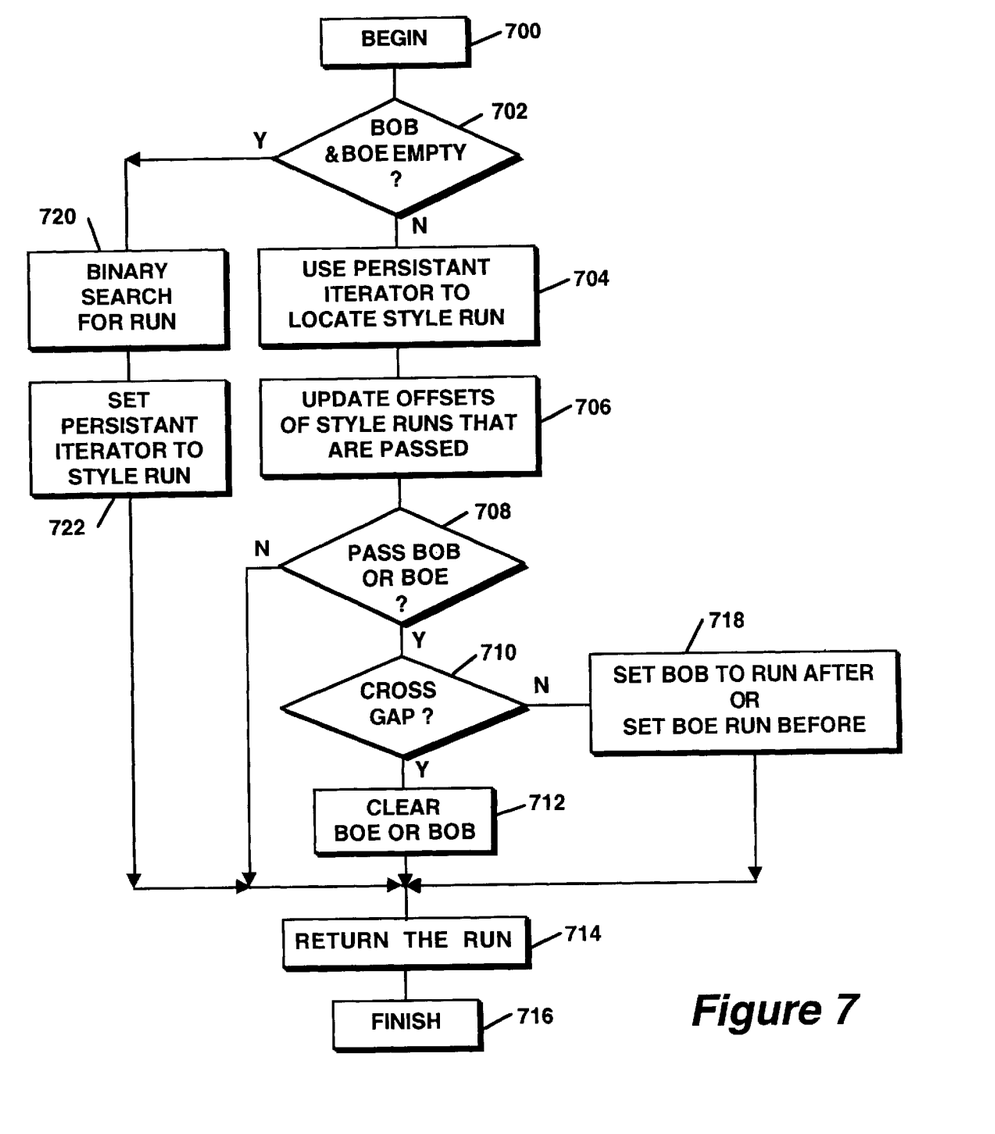
FIG. 7 is a flow chart which illustrates the process of locating a style run.

The method for locating the style run, as in step 602, is set forth in greater detail in the flow chart of FIG. 7 which begins in step 700 and proceeds from there to step 702 where it is determined whether the end point indicators BOB and BOE are empty. If the end point indicators are not empty, the process proceeds to step 704 where a persistent iterator is used to locate the style run associated with the character of interest. From step 704, the process proceeds to step 706 where, concurrent with the operation of step 704 the offsets of style runs that are passed in step 704 are updated. From step 706, the process proceeds to step 708 where it is determined whether either end point indicator, BOB or BOE, has been exceeded. If one of the end points has been exceeded, the process proceeds to step 710 where it is determined whether the gap has been crossed and, if it has, the process proceeds to step 712 where either end point indicator BOE or end point indicator BOB is cleared, depending upon which one has been passed. From step 712 the process proceeds to step 714 where the style run of interest is returned and from step 714 the process proceeds to finish in step 716.

If in step 710 it is determined that the gap has not been crossed, the process proceeds from step 710 to step 718 where end point indicator BOB is set to the style run location after the present style run or end point indicator BOE is set to the style run location before the present style run. That is, if BOB is crossed without crossing the gap, the process is moving forward through the array, since the iterator position should always be outside the range specified by BOB and BOE. If offsets are being recalculated as the process proceeds, BOB should be incremented to point to the first style run whose offset has not been recalculated. If the gap is passed, everything before the gap has been updated and BOB may be cleared, but BOE may not be cleared unless it is also passed. The process proceeds similarly when iterating backward through the array. From step 718 the process proceeds to step 714 as described before. If in step 702 it is determined that end point indicators BOB and BOE are empty, the process proceeds from step 702 to step 720, where a binary search is conducted to locate the style run of interest. From step 702 the process proceeds to step 722 where the persistent iterator is set to the present style run and from step 722 the process proceeds to step 714 and from there as previously described.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. The mechanism which associates a style element with a contiguous group of characters may take be explicit, as in the case an offset value or implicit, as in the case of a run length which may be accumulated with other run lengths to perform the desired correlation. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, such modifications to the inventive concept are intended to be covered by the appended claims.

What is claimed is:

1. Apparatus for use with a computer system having a memory, the apparatus associating character style information with each character stored in a data structure in the memory and comprising:

an array generator which generates in the memory an array having a plurality of elements, some of the elements storing character style information arranged as a style run and an array gap including at least one empty element;

a mechanism located in each element which associates the element with a contiguous group of characters in the data structure, each character within the contiguous group having the same character style; and an editor which modifies character style information in an array element by moving the array elements in the array gap to a location adjacent to the array element being modified.

2. The apparatus of claim 1 wherein each style run comprises:

a character style indicator identifying selected character style information;

a location indicator; and a run length indicator which indicates the number of characters to which the selected character style information applies.

3. The apparatus of claim 2 wherein the location indicator comprises an offset value from the beginning of the data structure to the first character to which the character style information in the style run applies.

4. The apparatus of claim 3 wherein the location indicator comprises a first offset value from the beginning of the data structure to the character location when the character location is within a style run in an element located in the array before the array gap and a second offset value from the end of the data structure to the character location when the character location is within a style run in an element located in the array after the gap.

5. The apparatus of claim 4 wherein the character style information comprises a pointer to a location in the memory containing style information.

6. The apparatus of claim 3 further comprising a search mechanism which locates a style run containing style information associated with a specific character by performing a binary search of the offset values in the style runs until an offset value is found which indicates that the character style information associated with the specific character is contained within the associated style run.

7. The apparatus of claim 6 further comprising a persistent iterator object which stores the array element containing the most recently modified style run.

8. The apparatus of claim 7 wherein the location indicator comprises a first offset value from the beginning of the data structure to the character location when the character location is within a style run in an element located in the array before the array gap and a second offset value from the end of the data structure to the character location when the character location is within a style run in an element located in the array after the gap, the search mechanism employing the persistent iterator to locate a style run containing style information associated with a character of interest whenever style information is modified without adding style runs to or deleting style runs from the style run array and to employ a binary search and the offset values to locate a style run containing style information associated with a character of interest whenever adding style runs to or deleting style runs from the style run array.

9. The apparatus of claim 6 wherein the array generator forms a gap in the array adjacent to the style run associated with a specific character and updates the offset values of style runs affected by forming the gap.

10. A method of associating character style information with each character stored in a data structure in memory, comprising the steps of:

(a) generating an array in the memory having a plurality of elements, some of the elements storing character style information arranged as style runs, and an array gap including at least one empty element; and (b) modifying the style run associated with a character of interest after moving the gap adjacent to the style run containing style information associated with a character of interest.

11. The method of claim 10 wherein step (b) comprises the step of:

(b1) locating the style run associated with a character of interest.

12. The method of claim 11 wherein each style run in the array contains offset information and run length information and step (b1) comprises:

(b2) matching the character of interest's position within the data structure with offset and run length information contained within the style runs.

13. The method of claim 12 wherein the offset information is relative to the beginning of the style run array for style runs situated before the array gap and is relative to the end of the style run array for style runs situated after the array gap.

14. The method of claim 11 wherein each style run includes run length information and the step of locating a style run comprises the step of:

(b3) performing a binary search of offset values.

15. The method of claim 14 comprising the steps of:

(b4) forming a stable iterator configured to indicate the location within the style array most recently modified, and (b5) locating a style run by examining the style run indicated by the stable iterator and using this style run if it contains the style information of interest, and employing the binary search the offset values as in step (b3) if it does not.

16. The method of claim 15 wherein the step of locating a style run comprises:

(b6) accumulating run lengths from the persistent iterator's location whenever style runs are not to be added or deleted, and (b7) matching the character of interest's position within the data structure with offset and run length information contained within the style runs whenever style runs are to be added or deleted, the offset information being relative to the beginning of the data structure for style runs situated before the array gap and relative to the end of the data structure for style runs situated after the array gap.

17. A computer program product for storing and modifying character style information associated with character information stored in a data structure, the computer program product comprising a computer usable medium having computer program code embodied thereon, the program code comprising:

computer program code configured to generate an array in a memory, the array having a plurality of elements, some of the elements storing character style information arranged as style runs, and to form an array gap including at least one empty element; and computer program code configured to modify the style run associated with a character of interest after moving the gap adjacent to the style run containing style information associated with a character of interest then.

18. The computer program product of claim 17 further comprising computer program code for locating the style run associated with a character of interest.

19. The computer program product of claim 18 further comprising computer program code for matching the character of interest's position within the data structure with offset and run length information contained within the style runs.

20. The computer program product of claim 18 further comprising computer program code for establishing offset information which is relative to the beginning of the data structure for style runs situated before the array gap and is relative to the end of the data structure for style runs situated after the array gap.

21. The computer program product of claim 18 wherein each style run comprises run length information and the computer program product comprises code configured to locate a style run by accumulating run lengths.

22. The computer program product of claim 21 further comprising computer program code configured to form a stable iterator which indicates the location within the style array most recently modified, and computer program code configured to locate a style run by accumulating run lengths from the position indicated.

* * * * *